United States Patent
Umayahara et al.

(10) Patent No.: US 8,153,314 B2
(45) Date of Patent: Apr. 10, 2012

(54) ALERT METHOD RELATING TO REMAINING FUEL AMOUNT OF FUEL CELL SYSTEM AND FUEL CELL SYSTEM USING THE SAME

(75) Inventors: Kenji Umayahara, Susono (JP); Shuji Hirakata, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 1921 days.

(21) Appl. No.: 10/664,857

(22) Filed: Sep. 22, 2003

(65) Prior Publication Data
US 2004/0062963 A1    Apr. 1, 2004

(30) Foreign Application Priority Data

Sep. 26, 2002   (JP) ................... 2002-280317
Jun. 11, 2003   (JP) ................... 2003-166208

(51) Int. Cl.
*H01M 8/04* (2006.01)
(52) U.S. Cl. .......... 429/429; 429/434; 429/443
(58) Field of Classification Search ............. 701/29, 701/1, 123, 22; 180/65.3; 429/12, 13, 22, 429/24, 429, 434, 443, 515, 25, 34, 23
See application file for complete search history.

(56) References Cited

U.S. PATENT DOCUMENTS

| | | | |
|---|---|---|---|
| 2003/0082421 A1* | 5/2003 | Yonetsu et al. | 429/25 |
| 2003/0150655 A1* | 8/2003 | Itou | 180/65.3 |
| 2004/0005487 A1* | 1/2004 | Matoba | 429/22 |
| 2005/0031922 A1* | 2/2005 | Clingerman et al. | 429/22 |
| 2006/0212194 A1* | 9/2006 | Breed | 701/29 |
| 2007/0003804 A1* | 1/2007 | Ogawa | 429/22 |
| 2007/0259220 A1* | 11/2007 | Redmond | 429/12 |

FOREIGN PATENT DOCUMENTS

| | | |
|---|---|---|
| DE | 100 43 724 A1 | 3/2001 |
| EP | 1 055 545 A2 | 11/2000 |
| JP | A 7-169476 | 7/1995 |
| JP | A-7-240213 | 9/1995 |

(Continued)

OTHER PUBLICATIONS

Japanese Patent Office, *Japanese Decision of Refusal for Japanese Patent Application No. 2003-166208* (with English translation), date: Jan. 19, 2010, pp. 1-2.

*Primary Examiner* — Cynthia H. Kelly
*Assistant Examiner* — Monique Wills
(74) *Attorney, Agent, or Firm* — Oliff & Berridge, PLC (57) ABSTRACT

An alert method capable of preventing problems due to excessive lowering of a remaining fuel amount of a fuel cell system is provided. The alert method includes the following steps of: switching over operation/stopped states of the fuel cell system, detecting that the state of the fuel cell system is switched over to a stopped side, and communicating information related to the remaining fuel amount to a user when fuel of the fuel cell system is consumed in a state where the switch is switched over to a stopped side. According to the alert method, information related to the remaining fuel amount is communicated to the user when fuel is consumed by the fuel cell system while in a practically stopped state. Therefore, it is possible to prevent excessive lowering of the remaining fuel amount of the fuel cell system.

13 Claims, 11 Drawing Sheets

FOREIGN PATENT DOCUMENTS

| | | |
|---|---|---|
| JP | A 08-329965 | 12/1996 |
| JP | A 11-214025 | 8/1999 |
| JP | A 2000-292195 | 10/2000 |
| JP | A 2001-143736 | 5/2001 |
| JP | A 2001-231108 | 8/2001 |
| JP | A 2001-231109 | 8/2001 |
| JP | A 2001-233044 | 8/2001 |
| JP | A 2002-125316 | 4/2002 |
| JP | A-2002-187587 | 7/2002 |

* cited by examiner

ALERT METHOD RELATING TO REMAINING FUEL AMOUNT OF FUEL CELL SYSTEM AND FUEL CELL SYSTEM USING THE SAME

INCORPORATION BY REFERENCE

The disclosure of Japanese Patent Application No. 2002-280317 filed on Sep. 26, 2002 and Japanese Patent Application No. 2003-166208 filed on Jun. 11, 2003, including the specification, drawings and abstract are incorporated herein by reference in its entirety.

BACKGROUND OF THE INVENTION

Field of the Invention

The invention relates to a method for alerting or notifying a user of information related to a remaining fuel amount of a fuel cell system and a fuel cell system using that method.

If the outside temperature falls to 0° C. or below when stopping a fuel cell system, water inside the fuel cell system freezes, which may damage operation thereafter. Therefore, art related to preventing freezing of the fuel cell system has been proposed. In this related art, when the outside temperature reaches or falls below an antifreeze temperature, the fuel cell system automatically initiates a heat-retention operation.

However, if the heat-retention operation is conducted for a long period of time, fuel for the fuel cell system is consumed, and there is a possibility of insufficient fuel during operation thereafter. This type of problem is not limited to cases of conducting the heat-retention operation for preventing freezing; it is a problem that can occur when the fuel cell system is continuously operated due to any cause.

SUMMARY OF THE INVENTION

An alert method relating to a remaining fuel amount of a fuel cell system is provided as a first aspect of the invention. The alert method includes the steps of: switching over operation/stopped states of the fuel cell system; detecting that the state of the fuel cell system is switched over to a stopped side; and communicating information related to the remaining fuel amount to a user when fuel of the fuel cell system is consumed in a state where the switch is switched over to a stopped side.

According to the above alert method, information related to the remaining fuel amount is communicated to the user when fuel is consumed by the fuel cell system while in a practically stopped state. Therefore, it is possible to prevent excessive lowering of the remaining fuel amount of the fuel cell system.

Furthermore, an alert method relating to a remaining fuel amount of a fuel cell system mounted in a moving body is provided as a second aspect of the invention. The alert method includes the steps of: switching over operation/stopped states of the moving body; detecting that an ignition switch of the moving body is switched over to a stopped side; and communicating information related to the remaining fuel amount when fuel of the fuel cell system is consumed in a state where the switch is switched over to a stopped side to an information terminal of a user at a location away from the moving body using wireless communication.

According to the above alert method, information related to the remaining fuel amount is communicated to the user, therefore, it is possible to prevent excessive lowering of the remaining fuel amount of the fuel cell system.

Furthermore, a fuel cell system is provided as a third aspect of the invention. The fuel cell system is provided with a switch which switches over operation/stopped states of the fuel cell system; a fuel storage unit which stores fuel supplied to the fuel cell system; a remaining amount measuring unit which measures a remaining fuel amount in the fuel storage unit; and a communication unit which communicates information related to a remaining fuel amount when fuel in the fuel storage unit is consumed to the user in a state where the switch is switched over to a stopped side.

Furthermore, a fuel cell system mounted in a moving body is provided as a fourth aspect of the invention. The fuel cell system is provided with a switch which switches over operation/stopped states of the fuel cell system; a fuel storage unit which stores fuel supplied to the fuel cell system; a remaining amount measuring unit which measures a remaining fuel amount in the fuel storage unit; and a communication unit which communicates information related to the remaining fuel amount when fuel in the fuel storage unit is consumed to an information terminal of a user at a location away from the moving body using wireless communication in a state where the switch is switched over to a stopped side.

Furthermore, a fuel cell system mounted in a moving body is provided as a fifth aspect of the invention. The fuel cell system is provided with a switch which switches over operation/stopped states of the fuel cell system; a fuel storage unit which stores fuel supplied to the fuel cell system; a remaining amount measuring unit which measures a remaining fuel amount in the fuel storage unit; and a control unit which controls an operation of the fuel cell system such that consumption of the fuel is stopped when the remaining fuel amount falls below a predetermined reference value, and setting different values for a first reference value that is the predetermined reference value for a temporary operation in which fuel in the fuel storage tank is consumed in a state were the switch is switched over to a stopped side and a second reference value that is the predetermined reference value for normal operation in which the fuel cell system is operating in a state where the switch is switched over to an operation side.

According to the fuel cell systems of the above third to fifth embodiments, stopping of the fuel cell system is determined using the respective difference reference values for normal operation and a temporary operation. Therefore, it is possible to prevent problems due to excessive lowering of the remaining fuel amount of the fuel cell systems during the respective operations.

BRIEF DESCRIPTION OF THE DRAWINGS

The above-mentioned embodiment and other embodiments, objects, features, advantages, technical and industrial significance of this invention will be better understood by reading the following detailed description of the exemplary embodiments of the invention, when considered in connection with the accompanying drawings, in which.

DETAILED DESCRIPTION OF THE EXEMPLARY EMBODIMENTS

In the following description and the accompanying drawings, the invention will be described in more detail in terms of exemplary embodiments.

Figure 1:
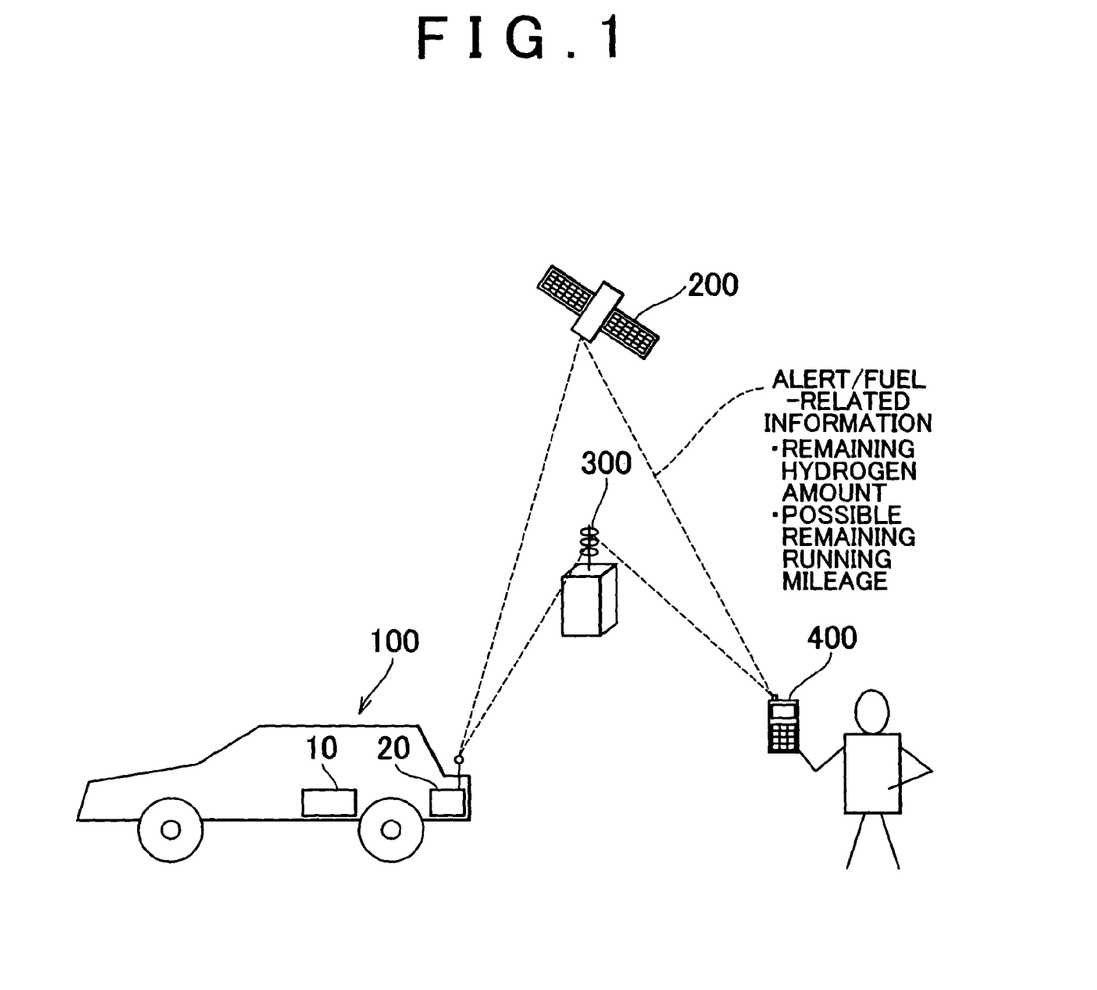
FIG. 1 is a schematic structural drawing of an electric vehicle communication system, which is an embodiment of the invention.

FIG. 1 is a schematic structural drawing of an electric vehicle communication system, which is an embodiment of the invention. The system includes an electric vehicle (also referred to simple as "vehicle") 100, a communication satellite 200 and a cellular phone base station 300 for wireless communication, and an information terminal 400 carried by a user. The electric vehicle 100 has a fuel cell system 10 as a main power source, and includes a communication unit 20 for wireless communication. The communication unit 20 is capable of functioning as an alert generating portion that forwards information (for example, amount of remaining hydrogen, possible remaining running mileage) and alerts relating to the remaining fuel amount to the information terminal 400 via the communication satellite 200 or the cellular phone base station 300.

It is possible for the user to use a cellular phone, house phone, personal computer, a so-called PDA (portable information terminal) or the like as the information terminal 400. In addition, the key holder of the key for the electric vehicle 100 or the key itself with added information receiving and display functions and the like may be used as the information terminal 400.

Note that for the forwarding of information to the information terminal 400 from the communication unit 20 of the electric vehicle 100, it is not necessary to employ wireless communication for the entire route, although a portion of the route may employ wireless communication. In the specification, the term "use wireless communication" signifies that at least one portion of the route employs wireless communication.

Figure 2:
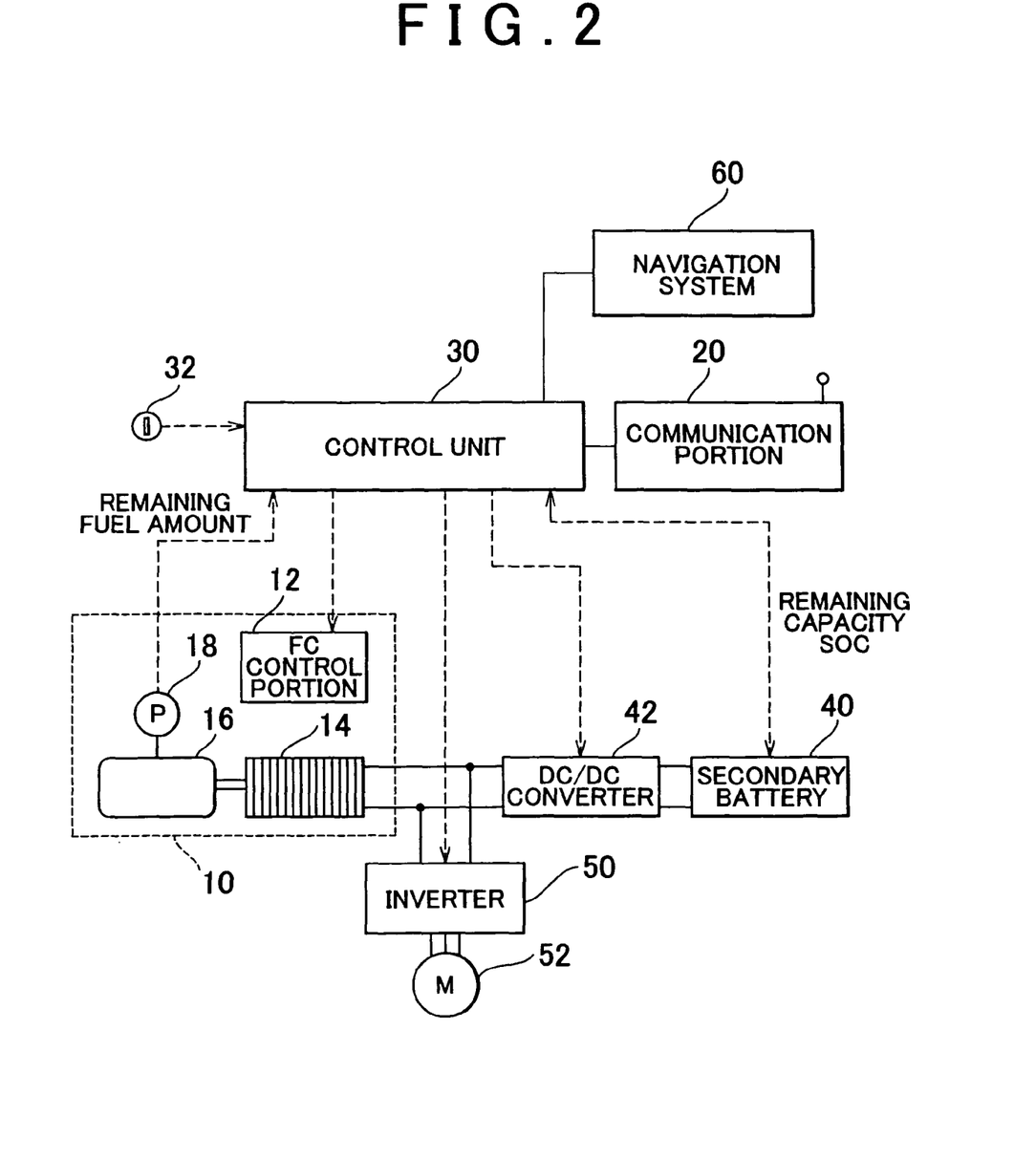
FIG. 2 is a block drawing showing a main electric structure of an electric vehicle 100.

FIG. 2 is a block drawing showing a main electric structure of the electric vehicle 100. The entire electric vehicle 100 is controlled by a control unit 30. The fuel cell system 10 has a fuel cell control unit 12 (hereinafter referred to as "FC control unit 12"), a fuel cell stack 14, a high-pressure hydrogen tank 16 acting as a fuel storage unit, and a pressure sensor 18 acting as a remaining amount measuring unit. Note that several structure elements of the fuel cell system 10 (air compressor, various valves and the like) are omitted in the figure.

The electric vehicle 100, in addition to the fuel cell system 10 acting as the main power source, has a secondary battery 40 acting as an auxiliary power source. The secondary battery 40 is connected in parallel with the fuel cell stack 14 via a DC/DC converter 42. A three-phase inverter circuit 50 creates a three-phase AC power source from these DC power sources, which is supplied to a motor 52 for driving a wheel, and controls the rotational speed and torque of the motor 52.

The control unit 30 receives various signals from various sensors. For example, a signal indicating the remaining fuel amount (specifically, pressure) is received from the pressure sensor 18 of the high-pressure hydrogen tank 16, and a signal indicating a remaining capacity SOC is received from the secondary battery 40. Furthermore, the control unit 30 is connected to a navigation system 60 for displaying the travel route of the vehicle and the like.

When a key 32 (ignition key) of the electric vehicle 100 is operated to an ON state, each portion including the control unit 30 are activated to create a state allowing operation of the electric vehicle 100 by the user. On the other hand, when the key 32 is set to an OFF state, the control unit 30 stops the operation of each portion. However, the FC control unit 12 implements a heat-retention operation of the fuel cell system 10 if necessary regardless of the ON/OFF state of the key 32 when the outside temperature falls to a freezing temperature (for example, 0° C.) or below. By generating electric power with the fuel cell stack 14, the heat-retention operation works to prevent the freezing of water in the fuel cell stack 14 and other portions. Consequently, during the heat-retention operation, hydrogen within the hydrogen tank 16 is gradually consumed, thus lowering the remaining amount. Note that the power created by the generating of electric power is used as the force operating auxiliary machinery such as an air compressor and as power for a heat-transmitting heater. However, when surplus power is generated, it is used for recharging the secondary battery 40. Hereinafter, various processing sequences are described for when such a heat-retention operation is conducted that lowers the remaining hydrogen amount.

Figure 3:
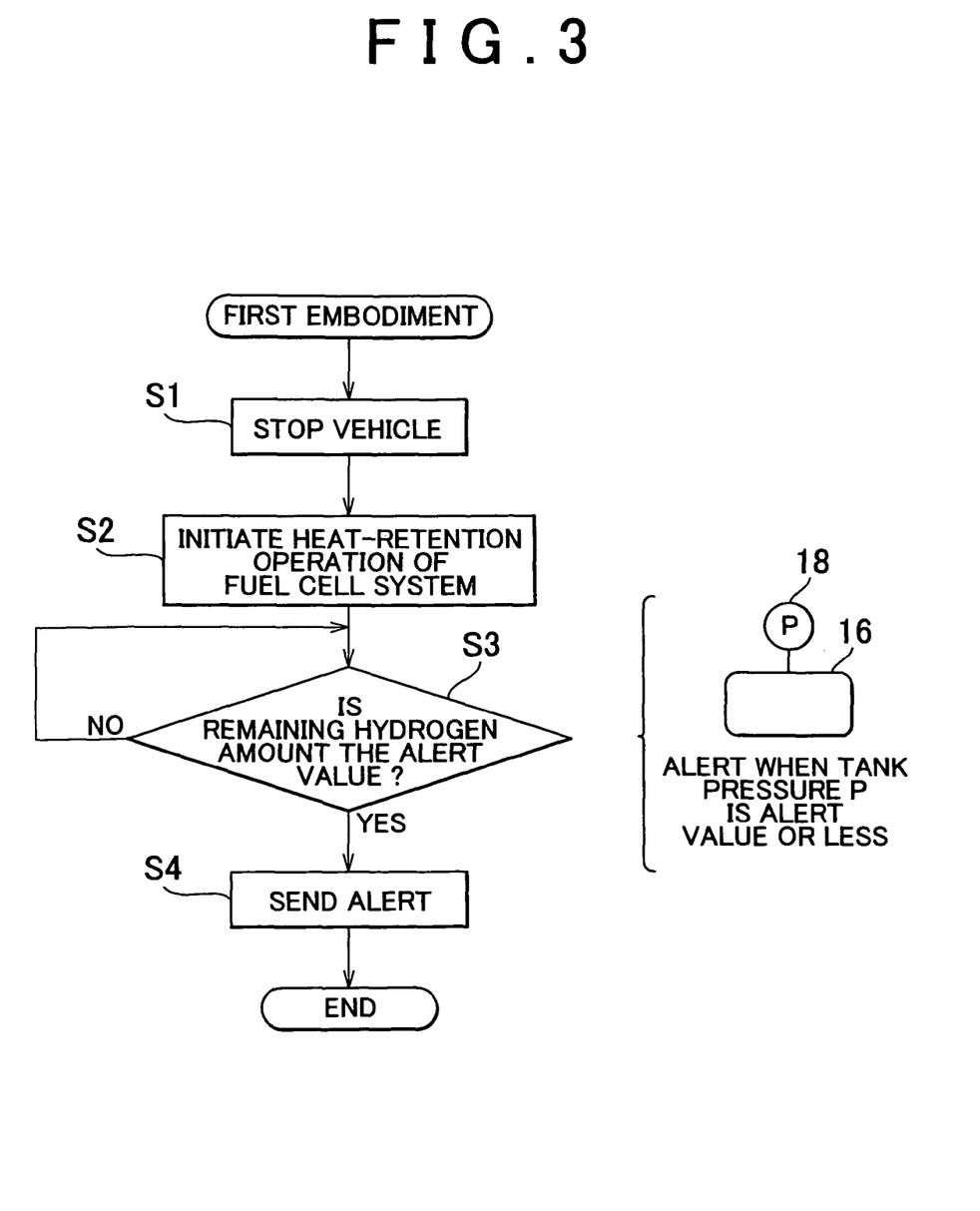
FIG. 3 is a flowchart showing a processing sequence according to a first embodiment of the invention.

FIG. 3 is a flowchart showing a processing sequence according to the first embodiment. The processing sequence is implemented under the control of the control unit 30, however, it may be implemented under the control of the FC control unit 12 instead. This also holds true in other embodiments to be described later.

After the user turns the key 32 to OFF to stop the operation of the entire vehicle (step S1), if the outside temperature falls to a freezing temperature or below, the heat-retention operation of the fuel cell system 10 is initiated (step S2). During the heat-retention operation, the control unit 30 determines whether the remaining hydrogen amount in the hydrogen tank 16 has reached a predetermined alert value (also referred to as "alert generating level") (step S3). Specifically, for example, it is determined whether a tank pressure P measured with the pressure sensor 18 is a preset alert value or less. However, a tank weight or the like may be measured instead to determine the remaining hydrogen amount. If the remaining hydrogen amount is the alert value or less, the communication unit 20 sends an alert indicating that the remaining hydrogen amount has reached the alert value to the information terminal 400 (FIG. 1) of the user (step S4). The information terminal 400 notifies the user of the alert with a screen display and/or sound. Note that the control unit 30 and the communication unit 20 are capable of operating if necessary when the operation of the vehicle is stopped in order to perform such alerts.

Alerts communicated by the information terminal 400 may include a portion or all of the following various information in addition to the remaining hydrogen amount reaching the alert value.

(1) Current remaining hydrogen amount
(2) Possible heat-retention operation time (estimated time until hydrogen is gone)
(3) Possible remaining running mileage
(4) Outside temperature
(5) Vehicle position information (6) Position information (location, distance and the like) of nearest fuel station (hydrogen station)

(7) Route information to nearest fuel station

The information of the above (3) (possible remaining running mileage) may be calculated in accordance with the remaining hydrogen amount, or calculated based upon both the remaining hydrogen amount and the remaining capacity of the secondary battery 40. The information of the above (5) to (7) can be obtained by using a GPS terminal function of the navigation system 60. Note that all this information may be sent from the communication unit 20 to the information terminal 400 in response to a user request.

However, an alert notifying the user preferably includes information related to at least one out of the remaining fuel amount, the possible heat-retention operation time of the fuel cell system 10, the possible remaining running mileage of the vehicle, and the distance to the nearest fuel station. If designed as such, it has the advantage of allowing the user to easily devise appropriate actions in response to the alert.

Thus, in the first embodiment, when the key 32 of the vehicle is set to the OFF state, the fuel cell system 10 conducts the heat-retention operation and if the remaining hydrogen amount reaches the alert value, an alert notifies the remote user. As a result, it is possible to prevent the remaining hydrogen amount from becoming excessively low without the user's knowledge.

Figure 4:
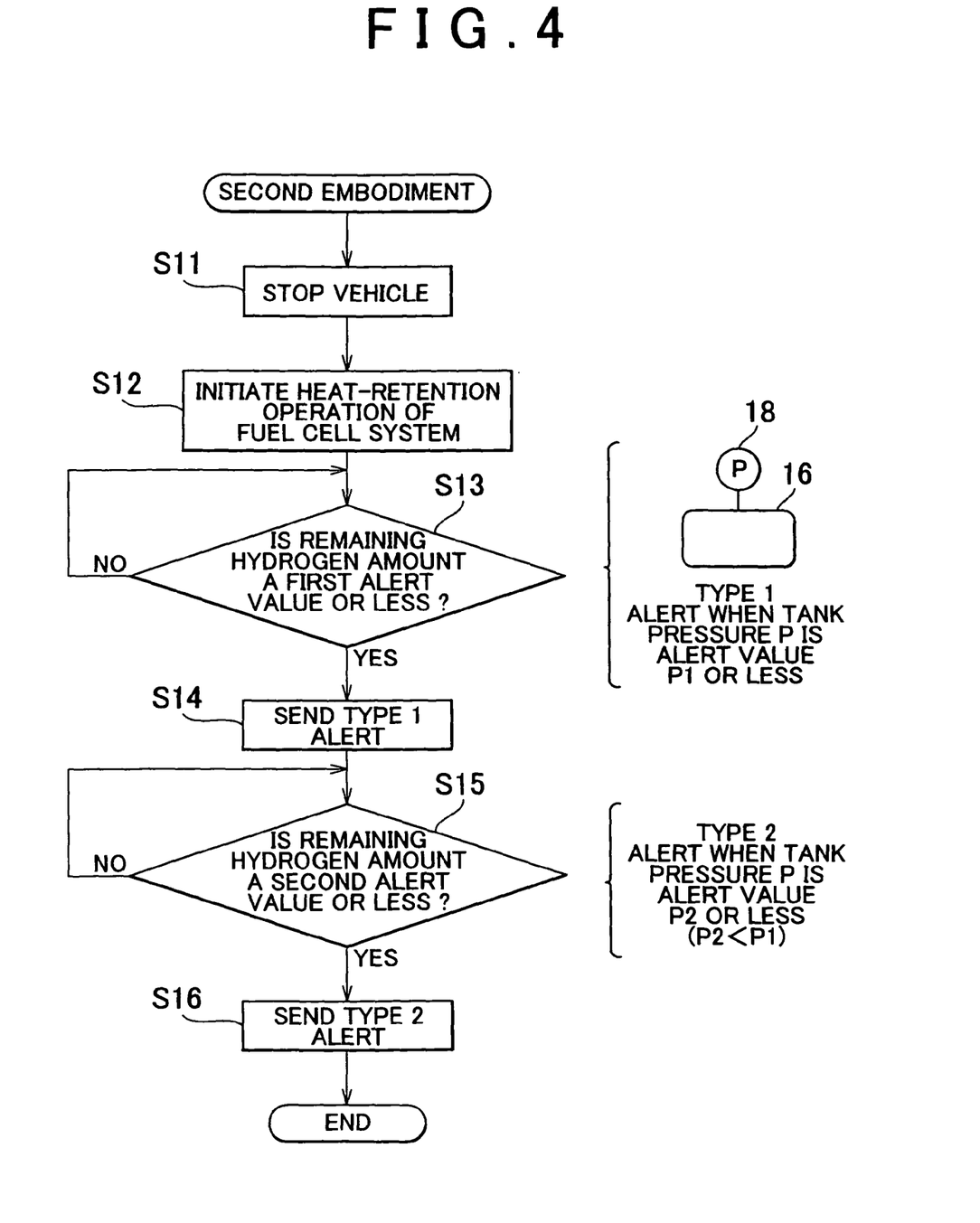
FIG. 4 is a flowchart showing a processing sequence according to a second embodiment of the invention.

FIG. 4 is a flowchart showing a processing sequence according a second embodiment. Step S11 (stopping the vehicle) and step S12 (initiating heat-retention operation) are identical to steps S1 and S2 in FIG. 3. After initiating the heat-retention operation, the control unit 30 determines whether the remaining hydrogen amount has reached a first alert value P1 (step S13). If the remaining hydrogen amount has reached the alert value P1, the communication unit 20 sends a type 1 alert to the information terminal 400 of the user (step S14). Thereafter, the control unit 30 continuously monitors the remaining hydrogen amount, and determines whether the remaining hydrogen amount has reached a second alert value P2 (P2<P1) (step S15). If the remaining hydrogen amount has reached the alert value P2, the communication unit 20 sends a type 2 alert to the information terminal 400 of the user (step S16).

Note that it is possible to set the first and second alert values P1 and P2 to arbitrary values. It is preferable that the alert values P1 and P2 are capable of being arbitrarily changed by the user. In addition, three or more values may be set as alert values.

Thus, in the second embodiment, a plurality of alert values is set in advance, and an alert is communicated when the remaining hydrogen amount reaches each alert value. Therefore, in the case where the user cannot take action after the first alert, action can be taken after any one of a plurality of alerts. Consequently, it is possible to reliably prevent the remaining hydrogen amount from becoming excessively low.

Figure 5:
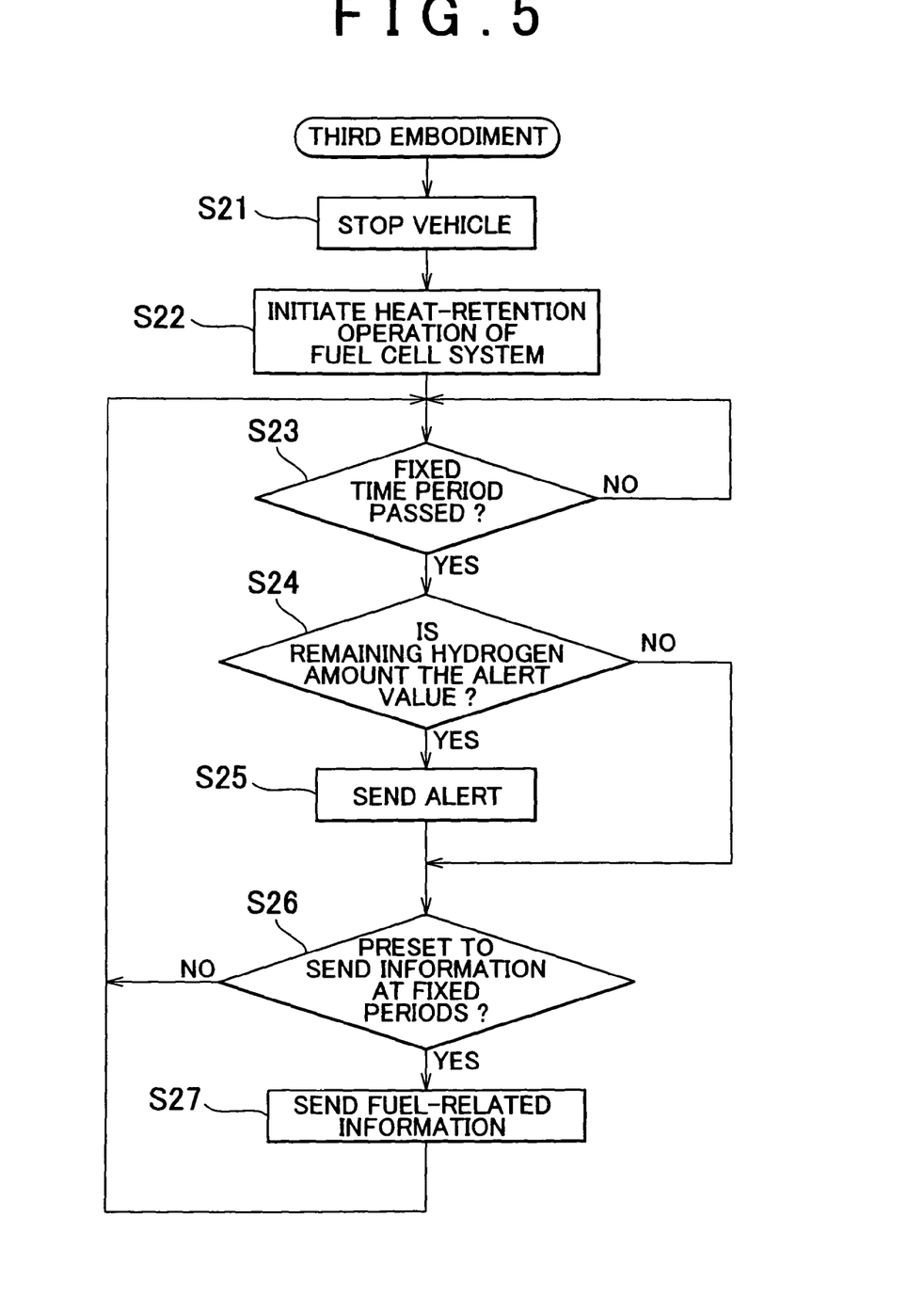
FIG. 5 is a flowchart showing a processing sequence according to a third embodiment of the invention.

FIG. 5 is a flowchart showing a processing sequence according to a third embodiment. Step S21 (stopping the vehicle) and step S22 (initiating heat-retention operation) are identical to steps S1 and S2 in FIG. 3. After initiating the heat-retention operation, the control unit 30 determines whether the remaining hydrogen amount has reached the alert value whenever a fixed time period passes (steps S23 and S24). If the remaining hydrogen amount has reached the alert value, the communication unit 20 sends an alert (step S25). On the other hand, if the remaining hydrogen amount has not reached the alert value, the process shifts to the following step S26.

In step S26, the control unit 30 determines whether or not information related to the remaining hydrogen amount (also referred to as "fuel-related information") has been preset by the user to be periodically sent to the information terminal 400. If set, the communication unit 20 sends the fuel-related information to the information terminal 400 (step S27). On the other hand, if not set, the process returns to step S23. Note that the fuel-related information sent preferably includes at least one portion of information (1) to (7) described in the first embodiment.

Thus, in the third embodiment, fuel-related information is designed to be sent to the information terminal 400 after every fixed time period (i.e., in a fixed cycle), therefore, it is possible to obtain information related to the remaining hydrogen amount before the remaining hydrogen amount reaches the alert value. In addition, an alert is sent when the remaining hydrogen amount reaches the alert value, therefore, it is possible to prevent the remaining hydrogen amount from becoming excessively low without the user's knowledge.

Note that in the sequence in FIG. 5, the cycle for sending the fuel-related information and the cycle determining whether the remaining hydrogen amount has reached the alert value are identical, however, these two cycles can be respectively set to different arbitrary values by the user. For example, the cycle for determining whether the remaining hydrogen amount has reached the alert value can be set shorter than the cycle for sending the fuel-related information. In this case, when the remaining hydrogen amount has reached the alert value, it is possible to send the alert with little time delay. Alternatively, when the remaining hydrogen amount has reached the alert value, the alert may be immediately sent without waiting for a fixed time period to pass.

Figure 6:
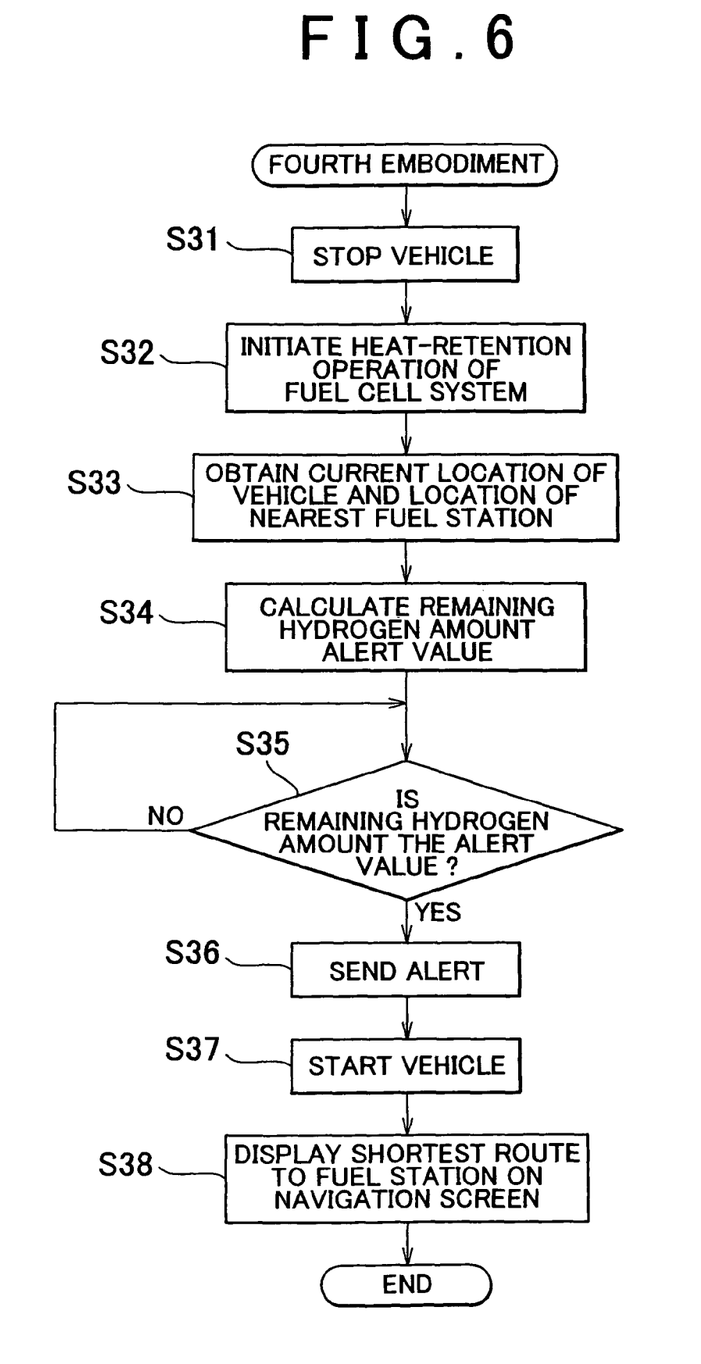
FIG. 6 is a flowchart showing a processing sequence according to a fourth embodiment of the invention.

FIG. 6 is a flowchart showing a processing sequence according to a fourth embodiment. Step S31 (stopping the vehicle) and step S32 (initiating heat-retention operation) are identical to steps S1 and S2 in FIG. 3. When the heat-retention operation is initiated, the control unit 30 obtains the current location of the vehicle and the location of the nearest fuel station (hydrogen station) from the navigation system 60 (step S33).

In step S34, the control unit 30 calculates the alert value of the remaining hydrogen amount based upon the current location of the vehicle and the location of the nearest fuel station. The alert value is set such that the possible remaining running mileage of the vehicle when the remaining hydrogen amount reaches the alert value includes a predetermined margin with respect to the distance to the nearest fuel station (required moving distance). Specifically, for example, the alert value is set such that the possible remaining running mileage of the vehicle is a value including a 10% margin over the required moving distance.

The control unit 30 determines whether the remaining hydrogen amount has reached the alert value (step S35), if the alert value is reached, the communication unit 20 sends an alert to the information terminal 400 (step S36).

Thereafter, when the user returns to the vehicle and starts the vehicle by turning the key 32 to the ON state (step S37), the shortest route to the nearest fuel station is automatically displayed on the screen of the navigation system 60 (step S38). Consequently, the user can move the vehicle to the nearest fuel station in a short time in accordance with the display. Note that either the "shortest-time route" or the "shortest-distance route" may be displayed as the "shortest route".

Thus, in the fourth embodiment, after an alert of the remaining hydrogen amount is generated, when the user returns to the vehicle and turns the key to ON, the shortest route to the fuel station is displayed on the navigation screen, therefore, the user can reach the fuel station in a short period of time.

Figure 7:
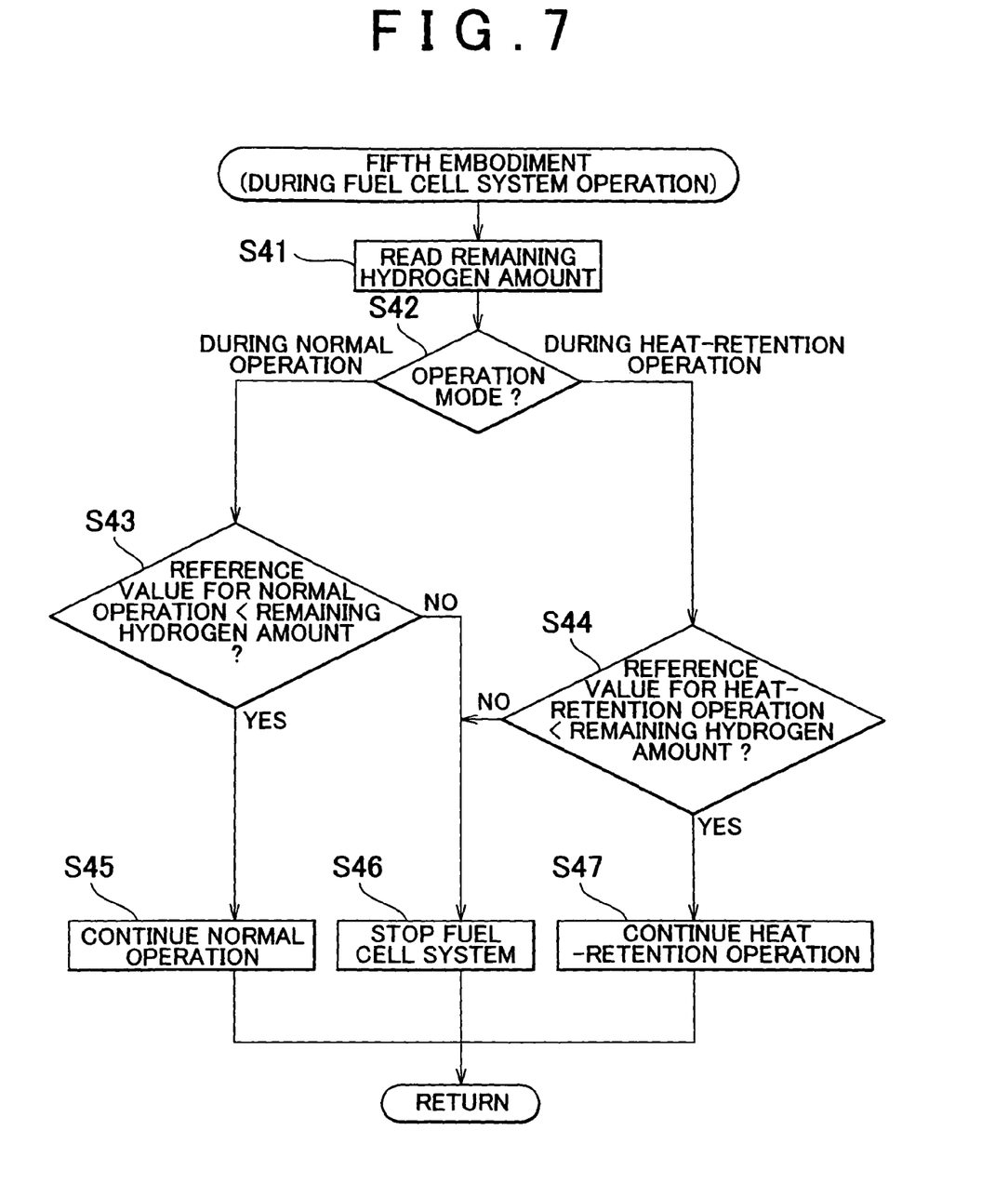
FIG. 7 is a flowchart showing a processing sequence according to a fifth embodiment of the invention.

FIG. 7 is a flowchart showing a processing sequence according to a fifth embodiment. In the fifth embodiment, it is assumed that fuel is consumed due to performing normal operation or the heat-retention operation of the fuel cell system 10 prior to the initiation of processing in FIG. 7. In addition, the processing sequence in FIG. 7 is normally executed with respect to each fixed time period.

In step S41, the control unit 30 obtains the remaining hydrogen amount in the hydrogen tank 16. Specifically, the tank pressure P measured by the pressure sensor 18 is obtained as the remaining hydrogen amount. Alternatively, in place of pressure P, a map indicating the relationship between the pressure P and the remaining hydrogen amount for finding the remaining hydrogen amount may be stored in the memory of the control unit 30, or other parameters related to the remaining hydrogen amount may be obtained as measurements indicating the remaining hydrogen amount.

In step S42, the control unit 30 determines whether normal operation or heat-retention operation is being performed, and shifts the process to step S43 or step S44. In the case of normal operation, in step S43, a system stop reference value applicable during normal operation (hereinafter referred to as "normal operation reference value") is compared with the remaining hydrogen amount. If the remaining hydrogen amount is greater than the normal operation reference value, the process shifts to step S45 and normal operation is continued without change. On the other hand, if the remaining hydrogen amount is equal to or less than the normal operation reference value, the process shifts to step S46, and the control unit 30 stops the operation of the fuel cell system 10. Consequently, if normal operation was performed until then, only the secondary battery 40 (FIG. 2) is used thereafter to perform vehicle operation. Note that "stopping the operation of the fuel cell system 10" signifies a state in which at least the supply of fuel (hydrogen in the present embodiment) is stopped, and fuel is not consumed.

If it is determined that the heat-retention operation is being performed in step S42, a system stop reference value applicable during the heat-retention operation (hereinafter referred to as "heat-retention operation reference value") is compared with the remaining hydrogen amount in step S44. If the remaining hydrogen amount is greater than the heat-retention operation reference value, the process shifts to step S47 and the heat-retention operation is continued without change. On the other hand, if the remaining hydrogen amount is equal to or less than the heat-retention operation reference value, the process shifts to step S46, and the control unit 30 stops the operation of the fuel cell system 10. Consequently, the heat-retention operation that consumed fuel (hydrogen) cannot be performed thereafter.

Figure 8:
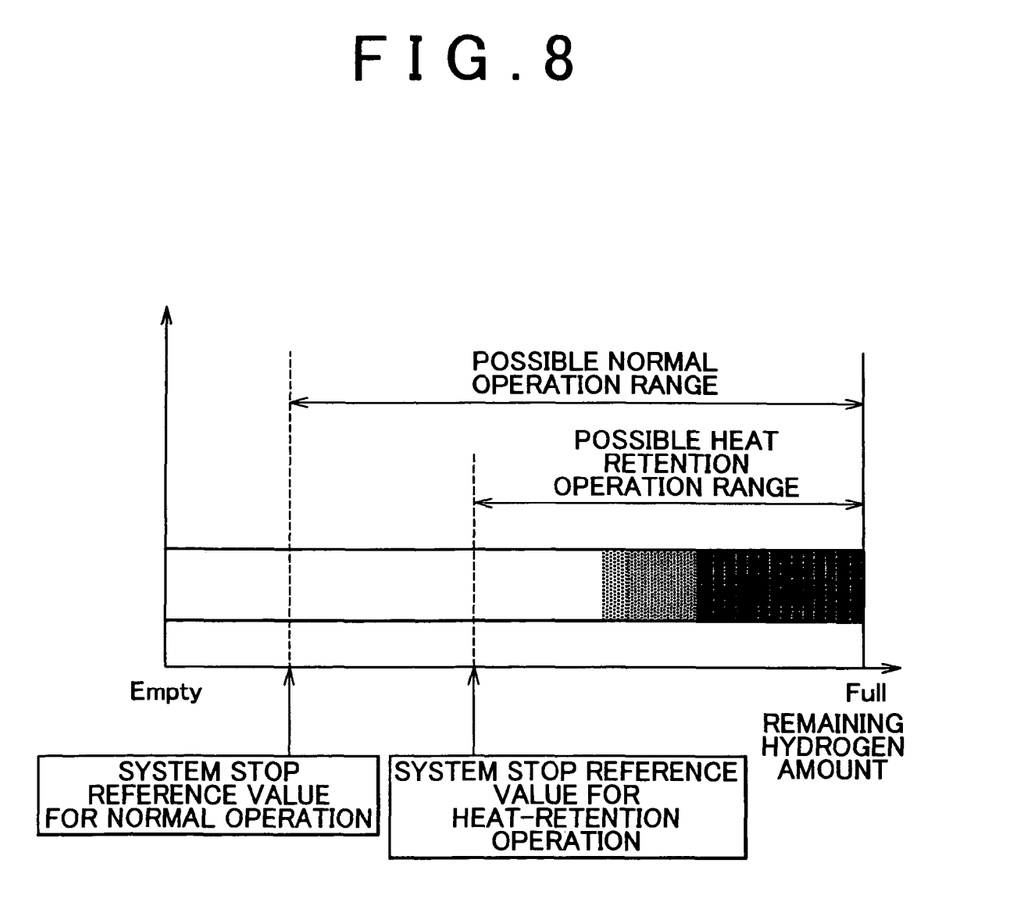
FIG. 8 is an explanatory drawing showing a system stop reference value according to the fifth embodiment of the invention.

FIG. 8 is an explanatory drawing showing the relationship between a system stop reference value for normal operation and a system stop reference value for the heat-retention operation. As understood from this example, normally the system stop reference value for the heat-retention operation is set to a value greater than the system stop reference value for normal operation. This is because if hydrogen is consumed during the heat-retention operation to the point of excessively lowering the remaining hydrogen amount, there is a high possibility of being unable to drive the vehicle to reach the fuel station thereafter. On the other hand, it is also because of a desire to use as much hydrogen as possible during normal operation to continue operation of the vehicle. The system stop reference value for normal operation, for example, is preferably set to a low value such that hydrogen of the fuel cell is not scarce, thus deteriorating the fuel cell stack 14 (FIG. 2). On the other hand, the system stop reference value for the heat-retention operation is preferably set to a comparatively large value such that operation of the vehicle can be continued over a certain distance or time. Specifically, the remaining hydrogen amount can be set as the system stop reference value for the heat-retention operation such that the nearest fuel station can be reached. Note that in general, respective appropriate system stop reference values should be set for normal operation and the heat-retention operation, therefore, the two system stop reference values may be set to different values.

As described above, in the fifth embodiment, when the remaining hydrogen amount falls below the predetermined reference value for normal operation and the heat-retention operation, the operation of the fuel cell system 10 is stopped so that no further fuel is consumed. As a result, it is possible to prevent excessive consumption of hydrogen by using appropriate reference values corresponding to the operation state.

Figure 9:
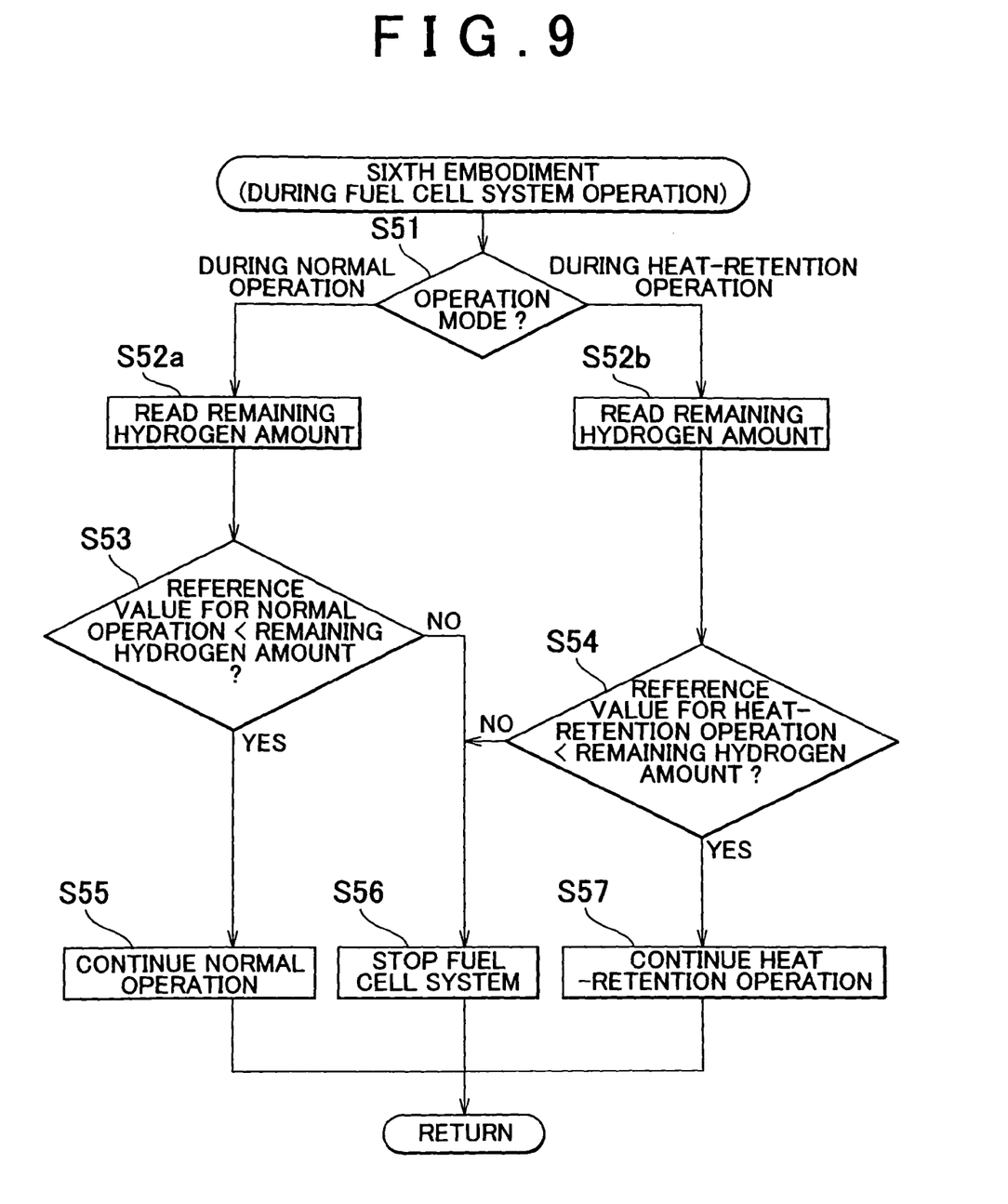
FIG. 9 is a flowchart showing a processing sequence according to a sixth embodiment of the invention.

FIG. 9 is a flowchart showing a processing sequence according to a sixth embodiment. In the sixth embodiment, the remaining hydrogen amount reading process and the operation mode determination process of the fifth embodiment (FIG. 7) are reversed. Namely, in step S51, the operation mode is determined, and the remaining hydrogen amount is read in step S52a or step S52b. The process in steps S53 to S57 is identical to the process in steps S43 to S47 in FIG. 7.

In the sixth embodiment as well, identical to the fifth embodiment, it is possible to prevent excessive consumption of hydrogen by using appropriate references values corresponding to the operation state.

Figure 10:
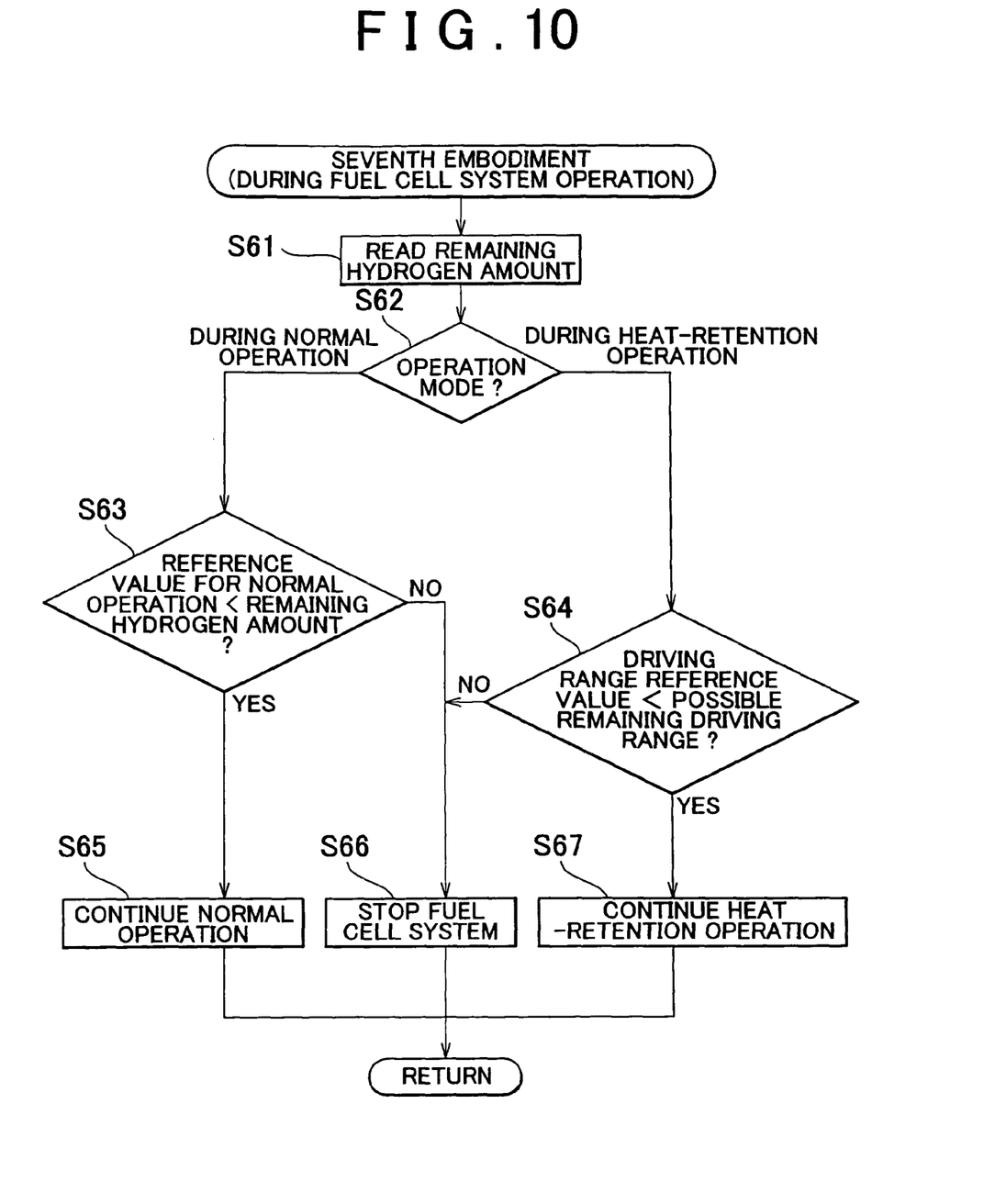
FIG. 10 is a flowchart showing a processing sequence according to a seventh embodiment of the invention.

FIG. 10 is a flowchart showing a processing sequence according to a seventh embodiment. In the seventh embodiment, step S44 in the fifth embodiment (FIG. 7) is replaced with step S64. Other steps S61 to S63 and S65 to S67 in FIG. 10 are identical to steps S41 to S43 and S45 to S47 in FIG. 7.

In step S64, the control unit 30 calculates the possible remaining driving range of the vehicle based upon the remaining hydrogen amount, and compares the possible remaining driving range with a driving range reference value. The driving range reference value is set to a value such that operation of the vehicle can be continued over a certain distance or time. Specifically, for example, the remaining hydrogen amount can be set as the system stop reference value for the heat-retention operation such that the nearest fuel station can be reached.

Thus, in the seventh embodiment, even when performing the heat-retention operation, hydrogen consumption can be stopped in a state capable of performing the operation of the vehicle during the distance specified by the driving range reference value. Therefore, it is possible to prevent excessive consumption of hydrogen by the heat-retention operation.

Figure 11:
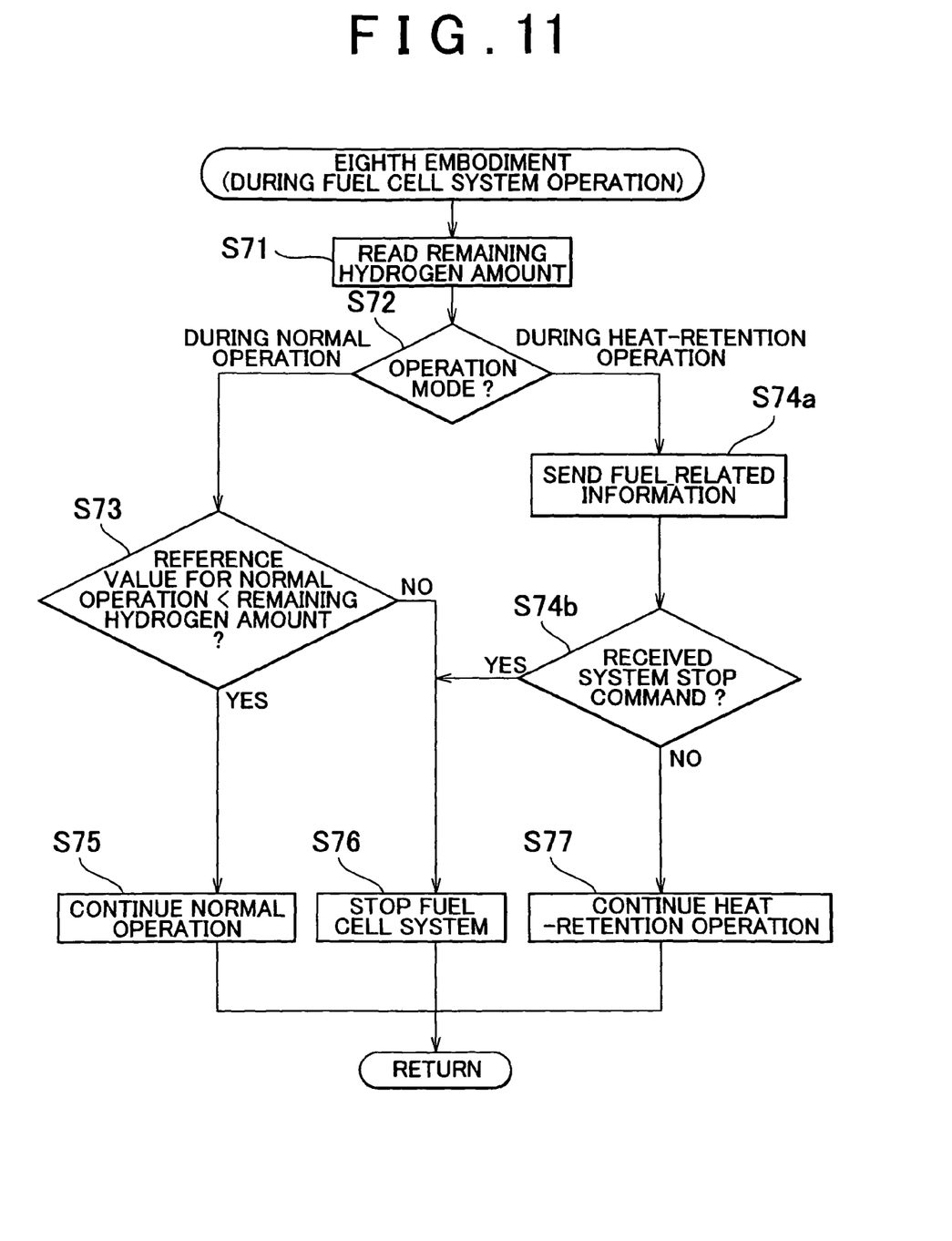
FIG. 11 is a flowchart showing a processing sequence according to a eighth embodiment of the invention.

FIG. 11 is a flowchart showing a processing sequence according to an eighth embodiment. In the eighth embodiment, step S44 in the fifth embodiment (FIG. 7) is replaced with steps S74a and S74b. Other steps S71 to S73 and S75 to S77 in FIG. 11 are identical to steps S41 to S43 and S45 to S47 in FIG. 7.

In step S74a, the communication unit 20 (FIG. 1) sends information related to the remaining fuel amount (fuel-related information) to the information terminal 400 of the user. Fuel-related information sent preferably includes at least one portion of the seven types of information (1) to (7) described in the first embodiment (current remaining hydrogen amount, possible heat-retention operation time, possible remaining running mileage, outside temperature, vehicle position information, position information of nearest fuel station, and route information to nearest fuel station). In particular, the remaining fuel amount is preferably included. The information terminal 400 notifies the user of the fuel-related information by screen display and/or sound.

The user receives notification of the fuel-related information, and if it is judged that the heat-retention operation should be stopped, operates the information terminal 400 to send a system stop command. In step S74b in FIG. 11, if the communication unit 20 receives the system stop command, the control unit 30 stop the heat-retention operation of the fuel cell system 10. On the other hand, if the system stop command is not received, the heat-retention operation is continued (step S77).

Note that when the system stop command is not received, as described in the aforementioned fifth embodiment to the seventh embodiment, the heat-retention operation of the fuel cell system 10 may be designed to be stopped in response to the system stop reference value for the heat-retention operation (reference value for the remaining hydrogen amount or reference value for the possible remaining driving range).

Thus, in the eighth embodiment, information related to the remaining fuel amount is communicated to the user during the heat-retention operation, and the heat-retention operation of the fuel cell system 10 is stopped in response to the user command. Therefore, it is possible to appropriately prevent excessive consumption of hydrogen in accordance with circumstances including the location of the stopped vehicle.

Note that the invention is not limited to the above-mentioned embodiments, and can be implemented in various forms, within the spirit and scope of the invention. For example, modifications such as the following are possible.

In each of the above-mentioned embodiments, information is spontaneously sent from the vehicle to the information terminal 400 of the user. However, fuel-related information from the vehicle may be sent when the user sends a request from the information terminal 400 instead. In this case, even if the user is separated from the vehicle, it is possible to obtain fuel-related information at any time desired.

In the above-mentioned embodiments, the high-pressure tank 16 is used as a fuel storage unit. However, a liquid hydrogen tank, a solid metal hydride or the like may be used as a fuel storage unit instead. In addition, fuel for reforming (alcohol such as methanol, and hydrocarbon compounds such as gasoline, aldehyde, and ether) may be stored in the fuel storage unit instead of storing hydrogen gas to create hydrogen for conducting reforming in a reforming unit, which is supplied to the fuel cell stack.

The system stop reference value used in the fifth to eighth embodiments described earlier may be set to various values other than described above. For example, the system stop reference value may be designed so as to allow arbitrary setting by the vehicle user. Alternatively, the navigation system 60 (FIG. 2) may be used to search the distance to the nearest fuel station such that the system stop reference value for remaining possible mileage is set to a distance greater than that distance.

Furthermore, the system stop reference value for the heat-retention operation can be set to a value allowing the operation of the fuel cell system to be continued over a time period decided by a predetermined condition or longer. For example, the "time period decided by a predetermined condition" can be set as the time in which a distance of 20 km can be traveled at a speed of approximately 40 km/h on a smooth road. In this case, even after stopping the operation of the fuel cell system during temporary operation, normal operation over the time period or distance decided by that predetermined condition can be performed.

In the above-mentioned embodiments, examples of an electric vehicle using the fuel cell system were described, however, the invention is applicable to moving bodies other than automobiles including ships and trains. In addition, the invention is also applicable to stationary fuel cell systems.

In the above-mentioned embodiments, the operation/stopped states of the fuel cell system were switched over using the key of the vehicle. However, the switch for switching over the operation/stopping state of the fuel cell system can also take the form of an arbitrary switch other than the key of the vehicle. For example, in the case of a stationary fuel cell system, a switch for manually switching between operating/stopping of the fuel cell system itself is normally provided.

In the above-mentioned embodiments, a case is described in which the fuel cell system is performing the heat-retention operation. However, the invention is also applicable to cases in which fuel is consumed due to any cause when the fuel cell system is stopped by the user. For example, there are cases where the operation of the fuel cell system 10 is continued to continue recharging of the secondary battery 40 when the remaining capacity SOC of the secondary battery 40 is lowered while the key is turned to OFF (while the ignition switch is OFF), and the invention is also applicable to such cases. Namely, the invention is applicable to cases in which fuel of the fuel cell system is consumed in a state where the switch for switching over the operation/stopped state of the fuel cell system is switched to the stop side. Note that in the specification, an operation mode in which fuel of the fuel cell system 10 is consumed while the key is turned to OFF is also referred to as a "temporary operation". The heat-retention operation is an example of a temporary operation.

While the invention has been described with reference to exemplary embodiments thereof, it is to be understood that the invention is not limited to the exemplary embodiments or constructions. To the contrary, the invention is intended to cover various modifications and equivalent arrangements. In addition, while the various elements of the exemplary embodiments are shown in various combinations and configurations, which are exemplary, other combinations and configurations, including more, less or only a single element, are also within the spirit and scope of the invention.

What is claimed is:

1. An alert method relating to a remaining fuel amount of a fuel cell system comprising:
   switching from an operation state of the fuel cell system to a stopped state of the fuel cell system;
   detecting that the fuel cell system is switched to a stopped state; and
   communicating information related to the remaining fuel amount when fuel of the fuel cell system is consumed to an information terminal of a user located at a point away from a moving body that the fuel cell system is disposed on, when the fuel cell system is switched to the stopped state, wherein
   the communicating information related to the remaining fuel amount further comprises at least generating an alert for the user when fuel of the fuel cell system is consumed and the remaining fuel amount falls to an alert generating level, and
   the alert is sent to an information terminal of the user using wireless communication.

2. The alert method of claim 1, wherein
generating the alert for the user is implemented when fuel is consumed due to the fuel cell system performing a heat-retention operation.

3. The alert method of claim 1, wherein
generating the alert for the user is implemented multiple times in response to the remaining fuel amount.

4. The alert method of claim 1, wherein
the fuel cell system is mounted in a moving body, and
the alert includes information related to at least one of a remaining fuel amount, a possible remaining heat-retention operation time of the fuel cell system, a possible remaining running mileage of the moving body, vehicle position information, a distance to the nearest fuel station and a route information to nearest fuel station.

5. The alert method of claim 4, wherein
the alert generating level is set such that the possible remaining running mileage of the moving body includes a margin with respect to the distance to the nearest fuel station.

6. An alert method relating to a remaining fuel amount of a fuel cell system mounted in a moving body comprising:
switching from an operation state of the moving body to a stopped state of the moving body;
detecting that an ignition switch of the moving body is switched to the stopped state; and
communicating information related to the remaining fuel amount to a user when fuel of the fuel cell system is consumed when the ignition switch is switched to the stopped state to an information terminal of a user at a location away from the moving body using wireless communication.

7. The alert method of claim 6, wherein
communicating information to the user is conducted at every fixed time period.

8. The alert method of claim 6, wherein
communicating information to the user is conducted when the remaining fuel amount falls to an alert generating level.

9. The alert method of claim 6, wherein
communicating information to the user is conducted in response to a request from the user.

10. The alert method of claim 6, wherein
the fuel cell system stops consumption of the fuel in response to a system stop command after receiving the system stop command from the user.

11. The alert method of claim 1, wherein the remaining fuel amount is reduced when fuel of the fuel cell system is consumed in the stopped state when the fuel cell system is switched to the stopped state.

12. The alert method of claim 1, wherein the information terminal is selected from the group consisting of cellular phone, PDA, personal computer and house phone.

13. The alert method of claim 1, wherein the information related to the remaining fuel amount is at least one of a tank pressure and a tank weight.

* * * * *